United States Patent [19]
Nomura et al.

[11] Patent Number: 5,172,978
[45] Date of Patent: Dec. 22, 1992

[54] RADIANT THERMOMETER WITH AIMING SYSTEM

[75] Inventors: Toshiyuki Nomura, Kyoto; Naohiro Osuga, Takatsuki; Yuiji Tsujioka; Naoyuki Matsumoto, both of Kyoto, all of Japan

[73] Assignee: Horiba, Ltd., Kyoto, Japan

[21] Appl. No.: 703,181

[22] Filed: May 20, 1991

[30] Foreign Application Priority Data

May 23, 1990 [JP] Japan .................. 2-53942[U]

[51] Int. Cl.⁵ .................. G01J 5/08; G02B 27/30
[52] U.S. Cl. .................. 374/130; 374/121; 359/641; 359/799; 250/353
[58] Field of Search .............. 374/121, 130, 131, 132, 374/208; 250/338.1, 353; 359/641, 798, 799, 800

[56] References Cited

U.S. PATENT DOCUMENTS

| | | | |
|---|---|---|---|
| 2,761,072 | 8/1956 | Wormser | 374/130 X |
| 2,844,992 | 7/1958 | Bernhardt | 359/799 X |
| 3,745,347 | 7/1973 | deBrey et al. | 374/130 X |
| 4,315,150 | 2/1982 | Darringer et al. | 374/130 X |
| 4,494,881 | 1/1985 | Everest | 374/130 X |
| 4,588,253 | 5/1986 | Brunson | 359/641 X |
| 4,664,515 | 5/1987 | Imura et al. | 374/130 X |

Primary Examiner—William A. Cuchlinski, Jr.
Assistant Examiner—G. Bradley Bennett
Attorney, Agent, or Firm—Price, Gess & Ubell

[57] ABSTRACT

A radiant thermometer for detecting infrared rays coming from an object along an optical axis to determine its temperature is provided with an improved aiming system. An exterior housing supports an interior housing that mounts the detector having an opening for receiving the infrared rays. A visible sighting light source is provided in the exterior housing behind the detector. A peripheral lens system is mounted between the interior and the exterior housing to provide a cone shaped transmission of light having a larger field angle than a field angle of the detector. The cone shaped transmission of light is capable of being focused on the optical axis for aiming the radiant thermometer.

16 Claims, 3 Drawing Sheets

RADIANT THERMOMETER WITH AIMING SYSTEM

BACKGROUND OF THE INVENTION

1. Field of the Invention

The present invention relates to a radiant thermometer for detecting infrared rays radiated from an object to be measured to provide a temperature of the object based on the quantity of infrared rays radiated from a point in the object including a sighting or aiming system for indicating a particularly minute point to be measure.

2. Description of Related Art

A radiant thermometer is a passive instrument which detects infrared rays radiated from an object to be measured and is not brought into contact with the object to be measured. Accordingly, a radiant thermometer for measuring a temperature of a small portion of the object can be provided with a sighting system for indicating the position to be measured. Such a radiant thermometer is disclosed in FIG. 1 of Japanese Utility Model Application Laid-Open No. Sho 55-175835. In this radiant thermometer, infrared rays are condensated by means of a condensing lens to be incident upon a detector and a sighting light source and a sighting lens for focusing into an image of a sighting light on a point to be measured are provided on an optical axis in front of the condensing lens.

In such a radiant thermometer, the image of the sighting light source is focused on a point to be measured by means of the sighting lens, so that, even through the object to be measured or a portion to be measured is minute, any shift of a sighting position in the radial direction of the sighting lens can be comparatively easily removed by focusing the sighting light on the object to be measured.

However, the sighting light source and the sighting lens are provided on the optical axis on a side in front of the condensing lens, so that any infrared rays blocked by the sighting light source and the sighting lens cannot be incident upon the condensing lens and thus a problem has occurred in that infrared rays at these portions are lost.

Additionally, an opening angle or field angle from the point to be measured to the sighting lens is considerably smaller than that from the point to be measured to the condensing lens. Accordingly, a problem has occurred in that any shift in focus in the direction of the optical axis of the sighting lens can be difficult to identify and thus it is difficult to adjust the focus. Moreover, if a focus of the sighting light is shifted in the direction of the optical axis of the sighting lens, a difference in a diameter to be measured due to a dislocation on the point to be measured is considerably increased in comparison with the shift in focus, so that a problem has occurred also in that it is difficult to accurately position the light point to be measured within the minute portion to be measured.

SUMMARY OF THE INVENTION

The present invention solves the above described problems and aims at the provision of a radiant thermometer provided with an improved sighting or aiming system that can accurately coincide with a minute portion to be measured.

A radial thermometer, wherein infrared rays radiated from a point to be measured are focused in a light-receiving surface of a detector by means of a condensing lens, according to the present invention is characterized in that a visible sighting light source is arranged on an optical axis of the condensing lens on a side behind or opposite to the light-receiving surface of the detector and a sighting lens with an optical axis thereof coinciding with the optical axis of the condensing lens is arranged outside of a circumference of the condensing lens so that a sighting light from a sighting light source may be focused on the point to be measured by means of the sighting lens.

A ringed or nonringed lens may be used as the sighting lens. Also, a sighting lens having an optional construction capable of focusing the sighting light from the sighting light source on the point to be measured can be used. In addition, a number of sighting lenses arranged in the direction of the optical axis of the condensing lens may be optionally selected.

In the radial thermometer according to the present invention, the sighting light from the sighting light source is guided by means of the sighting lens to be focused on the optical axis of the condensing lens and a position, where the sighting light is focused, coincides with the point to be measured by the radial thermometer. In order to measure a temperature of the object to be measured, the portion to be measured is irradiated with the sighting light and the focus is adjusted to make the point to be measured coincide with the irradiated portion.

Since the sighting light source is arranged behind the detector, the entire quantity of infrared rays radiated from the portion to be measured is incident upon the condensing lens. In addition, since the sighting lens is arranged outside of a circumference of the condensing lens and the opening angle from the point to be measured to the sighting lens is larger than that from the point to be measured to the condensing lens, any shift in focus of the sighting light in the direction of the optical axis of the condensing lens can be easily confirmed and thus the focus can be easily adjusted.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

A first preferred embodiment is shown in FIGS. 1 to 3, in which.

DESCRIPTION OF THE PREFERRED EMBODIMENTS

The following description is provided to enable any person skilled in the art to make and use the 123 invention and sets forth the best modes contemplated by the inventors of carrying out their invention. Various modifications, however, will remain readily apparent to those skilled in the art, since the generic principles of the present invention have been defined herein specifically to provide an economical passive radiant thermometer with an improved aiming system.

Figure 1:
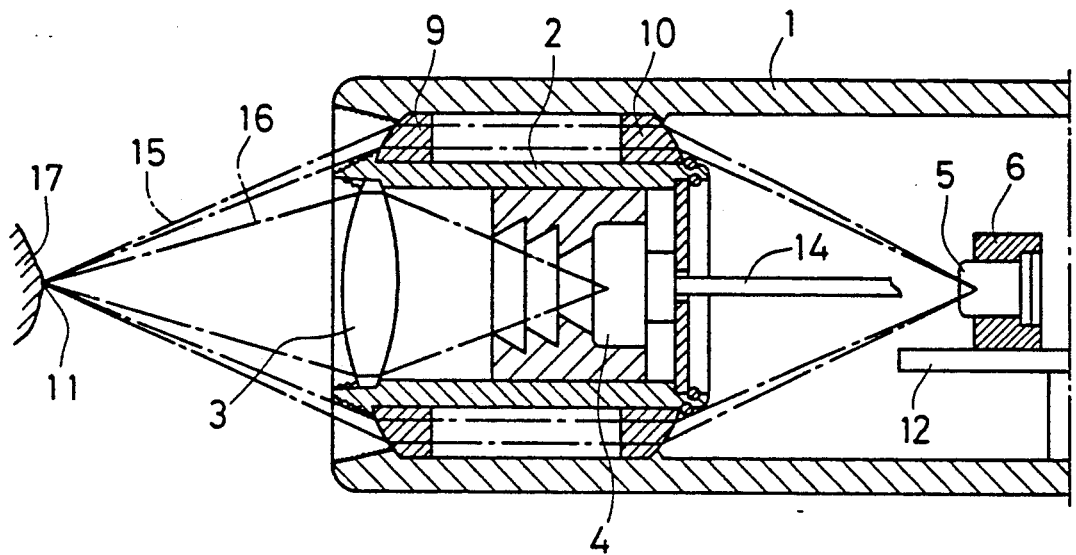
FIG. 1 is a cross-sectional side view.
Figure 2:
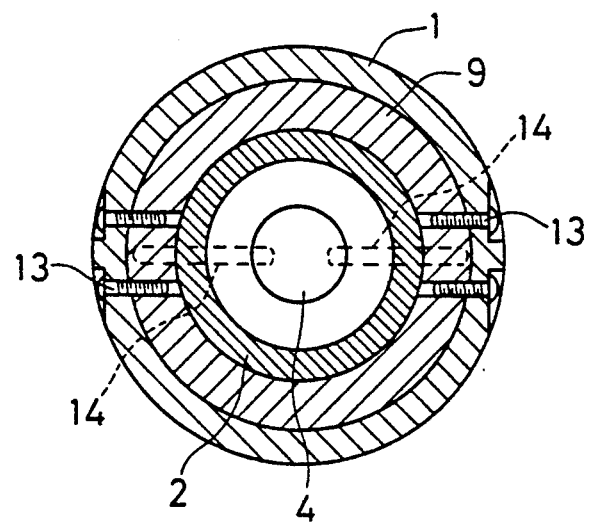
FIG. 2 is a cross-sectional front view.
Figure 3:
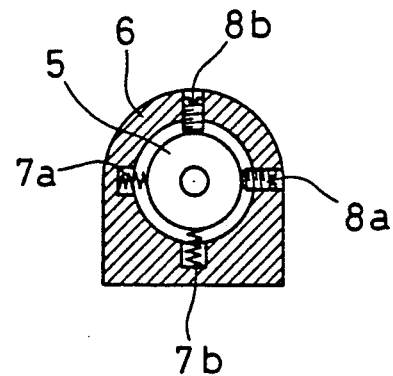
FIG. 3 is a cross-sectional view showing a mounting assembly of a sighting light source.

A first preferred embodiment of a radial thermometer according to the present invention will be described with reference to FIGS. 1 to 3.

Reference numeral 1 designates a case or housing that can mount a lens-barrel 2 at a central portion thereof. Reference numeral 3 designates a condensing lens for condensing infrared rays radiated from a point to be measured. The condensing lens 3 is arranged within a first portion of the lens-barrel 2 and a detector 4 for focusing infrared rays, which have been transmitted through the condensing lens 3, is arranged within the other end of the lens-barrel 2. A lens made of Si, Ge. BaF$_2$ and the like, through which infrared rays are readily transmissible, is suitable for the condensing lens 3.

Reference numeral 5 designates a sighting light source, such as an LED arranged on an optical axis of the condensing lens 3 on a side opposite or to the rear of a light-receiving surface of the detector 4. The sighting light source 5 is movably arranged on a holder 6 so as to be adjustable on the optical axis thereof (refer to FIG. 3). Reference numerals 7a and 7b designate springs mounted on the holder 6 to support the sighting light source 5. The holder 6 is provided with adjustable screws 8a and 8b mounted thereon opposite the springs 7a, 7b, accordingly, upon rotating one or both of the adjustable screws 8a, 8b, the springs 7a, 7b are expanded and contracted correspondingly to move and align the sighting light source 5.

Reference numerals 9, 10 designate aspherical (hyperbolic) ring sighting lenses arranged outside of the lens-barrel 2 and between the housing so that a visible sighting light, radiated from the sighting light source 5. The light may be focused on a point to be measured 11 on the basis of a distance between the condensing lens 3 and the detector 4 by making the optical axis of the lens 9 coincide with the optical axis of the condensing lens 3. Reference numeral 12 designates a printed circuit board and a reference numeral 13 designates cap screws for fixedly mounting the sighting lenses 9, 10 on the case 1 (refer to FIG. 2) provided at opposite positions. Reference numeral 14 designates lead wires of the detector 4. A compensating temperature sensor is not shown but is known in the art. The lead wires 14 are positioned so that they may be nearly positioned adjacent the cap screws 13 in the direction of the optical axis of the condensing lens 3. Reference numeral 15 designates an optical path of the sighting light radiated from the sighting light source 5, reference numeral 16 designates an optical path for infrared rays radiated from an object to be measured positioned at the point to be measured 11, and reference numeral 17 designates an object to be measured.

In this radiant thermometer, the sighting light from the sighting light source 5 is focused on the point to be measured 11 by means of the sighting lenses 9, 10, as above described. In addition, when it is required to adjust the optical axis of the sighting light source 5, the sighting light source 5 is moved by rotating one or both of the adjustable screws 8a, 8b, as above described.

Accordingly, when a temperature of the object to be measured is being measured, the sighting light radiated from the sighting light source 5 is transmitted through the sighting lenses 9, 10, and is focused on a surface of the object to be measured 17, whereby the point to be measured 11 can be accurately positioned on the object to be measured.

Since the sighting lenses 9, 10 are arranged outside of the lens-barrel 2, it is clear that an opening or field angle from the point to be measured 11 to the sighting lens 9 is larger than that from the point to be measured 11 to the condensing lens 3.

Accordingly, it is easy to confirm any shift of the sighting light from an in-focus position in the direction of the optical axis of the condensing lens 3 and thus the sighting light can be easily focused. Moreover, even though the sighting light is shifted in focus, in the above described manner, a difference in measured diameter due to a dislocation of the point to be measured 11 is small in comparison with the shift in focus. Accordingly, also in the case where the object to be measured is small or the portion to be measured is minute, if the sighting light is focused on them, the point to be measured 11 can be accurately positioned at the minute object to be measured or the portion to be measured and thus also the temperature of the minute object to be measured or portion to be measured can be accurately measured.

Furthermore, since the sighting lenses 9, 10 have a ring shape, any influences by the fixing cap screws 13 and the like are reduced and thus it is easier to increase a quantity of sighting light and distinctly focus the sighting light.

Since the sighting light source 5 is arranged on the side opposite to the light-receiving surface of the detector 4, the entire quantity of infrared rays radiated from the position to be measured on the object can be incident upon the detector 4 through the condensing lens 3 and thus any loss of infrared rays can be prevented.

Figure 4:
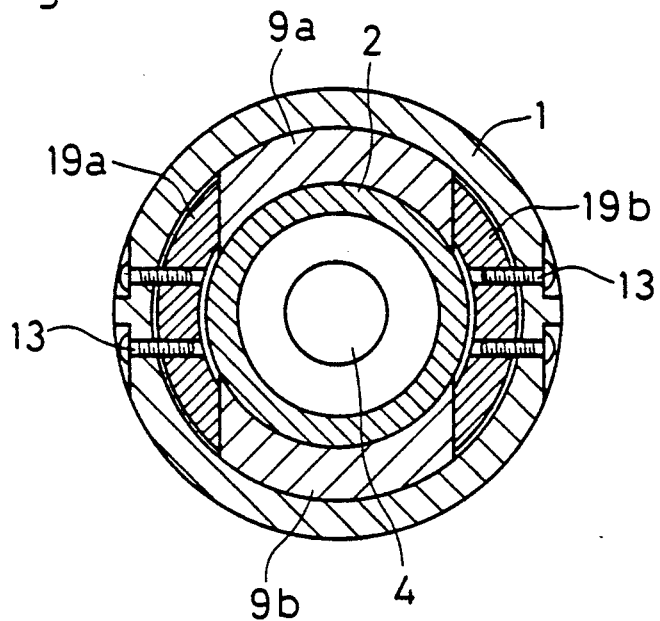
FIG. 4 is a cross-sectional front view showing a second preferred embodiment.

FIG. 4 shows a second preferred embodiment. In this preferred embodiment, the respective independent sighting lenses 9a, 9b are arranged on opposite sides in the radial direction of the lens-barrel 2. Accordingly, the quantity of the transmitted sighting light is smaller than that in the first preferred embodiment, so that a sighting light source (not shown) having a sufficient quantity of light, which can cope with the reduction in aperture of the transmitted sighting light, is used. For example, an LED having an increased brightness is used. Reference numerals 19a, 19b designate support members for fixing the sighting lenses 9a, 9b. Other elements are the same as in the first preferred embodiment, so that they are designated by the same reference numerals as in the first preferred embodiment.

Figure 5:
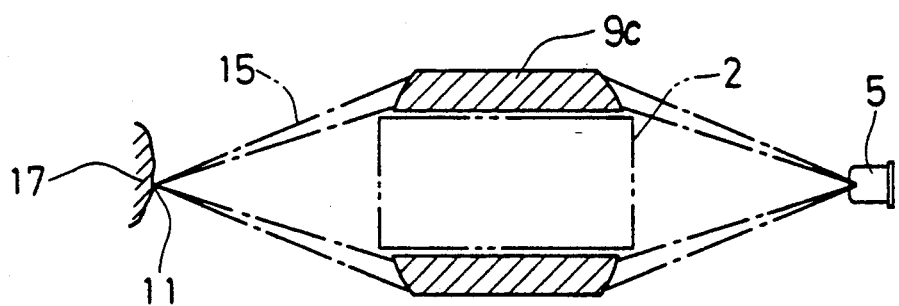
FIG. 5 is a schematic drawing showing a forth preferred embodiment.

FIG. 5 shows a third preferred embodiment and relates to a different configuration of the sighting lenses. In this preferred embodiment, a sighting lens 9c comprises a portion of a double-convex cylindrical lens having aspherical surfaces (hyperbolic surfaces). The sighting lens 9c can be composed of also a molded plastic lens to reduce the production cost.

Figure 6:
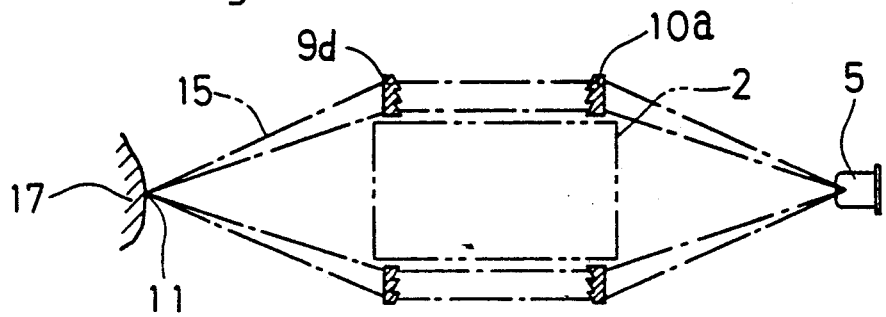

FIG. 6 shows a fourth preferred embodiment wherein the sighting lenses 9d, 10a are composed of a pair of Fresnel's lenses. Lenses corresponding in optical performance to aspherical surfaces can be obtained from the Fresnel's lenses by suitably selecting a method of cutting their grooves to reduce cost.

Figure 7:
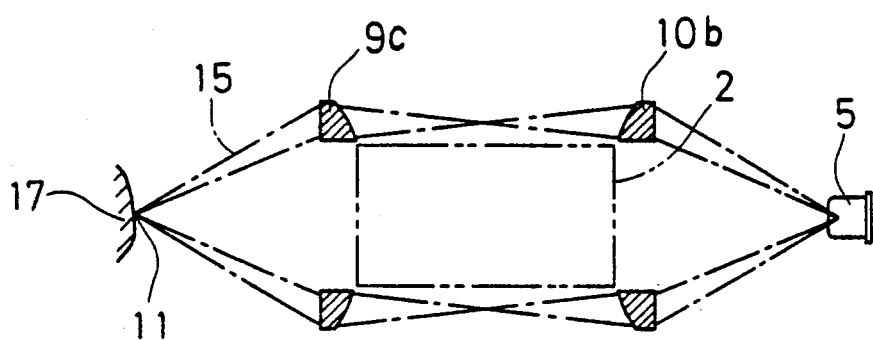
FIG. 7 is a schematic drawing showing a fifth preferred embodiment.

FIG. 7 shows a fifth preferred embodiment. In this preferred embodiment, any aberration of spherical lenses can be compensated by mounting them in opposition to each other. Thus, the sighting lenses 9c, 10b are composed of a pair of spherical lenses having opposite convex surfaces. The introduction of aberrations by the first lens will be compensated by the proper positioning of the second lens. Since the spherical lenses are used as the sighting lenses 9c, 10b, a small-scale production can be easily conducted.

Figure 8:
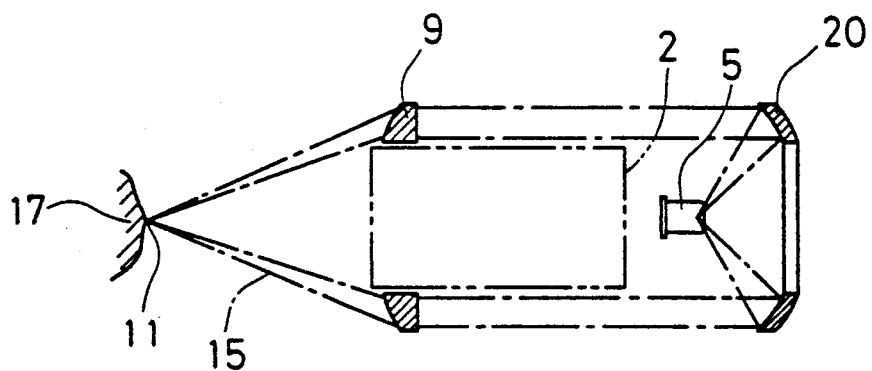
FIG. 8 is a schematic drawing showing a sixth preferred embodiment.

FIG. 8 shows a sixth preferred embodiment. In this preferred embodiment, a sighting light from a sighting light source 5 is reflected by a concave reflecting mirror 20 to be incident upon a sighting lens 9f and focused on a point to be measured 11. Accordingly, an optical axis of the sighting light can be adjusted by adjusting an angle of the reflecting mirror 20.

Other constructions of the respective preferred embodiments shown in FIGS. 5 to 8 are the same as in the first preferred embodiment, so that they are designated by the same reference numerals as in the first preferred embodiment.

In the radial thermometer, wherein the condensing lens for condensing the infrared rays radiated from the object to be measured and making them incident upon the detector is provided in the above described manner, the sighting light source is arranged on a side opposite to the light-receiving surface of the detector and the sighting lens for focusing the sighting light from the sighting light source is arranged outside of the circumference of the condensing lens.

Accordingly, the entire amount of infrared rays radiated from the object to be measured can be incident upon the condensing lens and detector and thus any condensing loss can be prevented, so that the temperature of the object to be measured can be accurately measured.

Since the field angle from the point to be measured to the sighting lens is larger than that from the point to be measured to the condensing lens, any shift in focus of the sighting light in the direction of the optical axis of the condensing lens can be easily confirmed and thus the focus can be easily adjusted. Moreover, even though a shift in focus of the sighting light may occur, the difference of the diameter to be measured is reduced in comparison with any shift in focus. Accordingly, the point to be measured can be accurately positioned at also the minute object to be measured or position to be measured by focusing the sighting light and thus the temperature of the object to be measured or position to be measured can be accurately measured.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved radiant thermometer having a detector on an optical axis for measuring infrared rays from an object to determine its temperature comprising:

a housing for supporting the detector having an opening for receiving the infrared rays;

means for focusing the infrared rays onto the detector from a measurement point on the object;

a visible sighting light source for providing an aiming light, and means for directing the sighting light from a position off axis of the detector optical axis to merge to a focus position on the optical axis, including a peripheral ring lens substantially surrounding the detector housing to provide a cone-shaped transmission of light having a larger field angle than a field angle of the detector, the cone-shaped transmission of light being focused to a point coincident with the measurement point whereby sighting of the radiant thermometer can be accomplished without blocking infrared rays to the detector.

2. The radiant thermometer as set forth in claim 1, wherein the means for directing includes a sighting lens formed so as to be aspherical.

3. The radiant thermometer as set forth in claim 1, wherein the sighting light from the sighting light source is reflected by a reflecting mirror to be incident upon the means for directing.

4. The radiant thermometer of claim 1 further including an exterior housing, the detector housing being mounted within the exterior housing by the means for directing the sighting light.

5. The radiant thermometer of claim 1 wherein the visible sighting light source is mounted in line with the optical axis of the detector at the rear of the detector.

6. The radiant thermometer of claim 1 wherein the means for directing the sighting light includes a conical reflector.

7. The radiant thermometer of claim 1 wherein the means for directing the sighting light includes a Fresnel lens.

8. The radiant thermometer of claim 5 wherein the means for directing the sighting light includes a substantially cylindrical hollow aspheric lens assembly.

9. The radiant thermometer of claim 1 wherein the means for directing the sighting light includes a pair of spherical lens surfaces positioned to be opposite each other.

10. An improved radiant thermometer having a detector on an optical axis for measuring infrared rays from an object to determine its temperature comprising:

an exterior housing having an opening at a front end to receive infrared rays;

an interior housing for supporting the detector having an opening for receiving the infrared rays, the interior housing being conventionally positioned in the exterior housing adjacent the front end;

means for focusing the infrared rays on the detector from a point on the object mounted in the opening of the interior housing;

a visible sighting light source for providing an aiming light positioned within the exterior housing adjacent a rear end of the exterior housing, and means, between the interior housing and the exterior housing, for directing the sighting light from a position off axis of the detector optical axis to form a cone-shaped transmission of light having a larger field angle than a field angle of the detector which can merge to a focus position on the optical axis, coincident with the object point to be measured whereby sighting of the radiant thermometer can be accomplished without blocking infrared rays to the detector.

11. The radiant thermometer of claim 10 wherein the means for directing includes a lens assembly mounted about a peripheral portion of the interior housing.

12. The radiant thermometer of claim 11 wherein the lens assembly includes a ring shaped lens.

13. The radiant thermometer of claim 11 wherein the means for directing the sighting light includes a Fresnel lens.

14. The radiant thermometer of claim 11 wherein the means for directing the sighting light includes a substantially cylindrical hollow aspheric lens assembly.

15. The radiant thermometer of claim 11 wherein the means for directing the sighting light includes a pair of spherical lens surfaces positioned to be opposite each other.

16. The radiant thermometer of claim 11 wherein the means for directing the sighting light includes a conical reflector.

* * * * *